United States Patent
Sakamoto et al.

(10) Patent No.: US 9,882,442 B2
(45) Date of Patent: *Jan. 30, 2018

(54) ROTATING ELECTRIC MACHINE INCLUDING ROTOR ARRANGED WITH INTERMEDIATION OF AIR GAP

(71) Applicant: NIPPON PISTON RING CO., LTD, Saitama-shi, Saitama (JP)

(72) Inventors: Masafumi Sakamoto, Saitama (JP); Shigeyoshi Sato, Saitama (JP); Shunsuke Takeguchi, Saitama (JP); Shun Yasuda, Saitama (JP)

(73) Assignee: NIPPON PISTON RING CO., LTD, Saitama-shi, Saitama (JP)

( * ) Notice: Subject to any disclaimer, the term of this patent is extended or adjusted under 35 U.S.C. 154(b) by 715 days.

This patent is subject to a terminal disclaimer.

(21) Appl. No.: 14/499,527

(22) Filed: Sep. 29, 2014

(65) Prior Publication Data

US 2015/0091405 A1    Apr. 2, 2015

(30) Foreign Application Priority Data

Sep. 30, 2013   (JP) ................................. 2013-205800

(51) Int. Cl.
   *H02K 1/27*      (2006.01)
   *H02K 21/24*     (2006.01)
   *H02K 1/06*      (2006.01)

(52) U.S. Cl.
   CPC ............. *H02K 1/2793* (2013.01); *H02K 1/06* (2013.01); *H02K 21/24* (2013.01); *H02K 2201/03* (2013.01)

(58) Field of Classification Search
   CPC .... H02K 1/182; H02K 1/2713; H02K 1/2793; H02K 21/026; H02K 21/24; H02K 37/08; H02K 37/125

(Continued)

(56) References Cited

U.S. PATENT DOCUMENTS 8,952,589 B2 *    2/2015  Sakamoto ................ H02K 1/06
                                                  310/106

FOREIGN PATENT DOCUMENTS

JP       2005318718 A  *  11/2005
JP       2012-130086 A    7/2012

OTHER PUBLICATIONS

Machine translation of JP 2005318718A retrieved from Espacenet on Jun. 29, 2017.*

* cited by examiner

*Primary Examiner* — John K Kim
*Assistant Examiner* — Minki Chang
(74) *Attorney, Agent, or Firm* — Sughrue Mion, PLLC

(57) ABSTRACT

An axial gap type rotating electric machine, having a stator with first tooth parts protruding in an axial direction and formed in a concentric arc-like manner, and a rotor with magnetic poles arranged in a distributed manner in the circumferential direction, and the magnetic poles include second tooth parts that protrude in the axial direction and are formed in a concentric arc-like manner, the second tooth parts being opposedly arranged so as to respectively engage with the first tooth parts with the intermediation of the air gap. The rotor is incorporated in the rotating member so as to be movable in the axial direction and so as not to be rotatable with respect to the rotating member. The rotating electric machine further includes an urging device that makes the air gap between the rotor and the stator adjustable.

6 Claims, 10 Drawing Sheets

(58) Field of Classification Search
USPC .......................... 310/49.42, 154.05, 156.32
See application file for complete search history.

ROTATING ELECTRIC MACHINE INCLUDING ROTOR ARRANGED WITH INTERMEDIATION OF AIR GAP

BACKGROUND OF THE INVENTION

Field of the Invention

The present invention relates to a rotating electric machine, and, more particularly, to an axial gap type rotating electric machine used as an electric motor and a power generator.

Description of the Related Art

Reduction in weight, thickness, length, and size of rotating electric machines used as electric motors and power generators is strongly required in the market. In recent years, improvement in energy saving and high efficiency of rotating electric machines is also increasingly required in order to address global warming. Reduction in vibration, noise, and cost of rotating electric machines is also strongly required. Under the circumstances, an axial gap type rotating electric machine having an air gap in a rotating shaft direction has a flattened shape, which is advantageous for reduction in thickness. Further, if a rotor of the axial gap type rotating electric machine is formed in a discoid shape, inertia thereof can be reduced, and hence the axial gap type rotating electric machine is suitable for a constant speed operation and a variable speed operation. Consequently, the axial gap type rotating electric machine starts to attract attention in recent years, and various modes are known therefor.

Japanese Patent Laid-Open No. 2012-130086 is proposed as a related conventional art.

Rotating electric machines are categorized into a radial gap type and an axial gap type, and rotation principles of the two types are the same as each other.

A brushless DC motor (hereinafter, referred to as BLDCM) and a synchronous power generator, in which a permanent magnet is used for a rotor, or a switched reluctance motor (hereinafter, referred to as SRM), in which a permanent magnet is not used for a rotor and teeth of a magnetic material are provided instead, are used as conventional general radial gap type rotating electric machines. According to an art for the BLDCM and the synchronous power generator or the SRM, a stator iron core is formed by laminating silicon steel plates, and, in a case of placing importance on an inexpensive price and efficiency, a winding wire is generally wound in a concentrated manner.

If a winding wire is wound in a distributed manner, a coil end portion that does not contribute to torque generation becomes large, a copper loss increases, and efficiency decreases. In comparison, if a winding wire is wound in a concentrated manner, the winding wire is simple and can be wound directly in a slot, so that the winding wire can be inexpensive.

In recent years, axial gap type BLDCM and SRM are also studied as in-vehicle motors for driving hybrid cars and electric cars. This is because flattened shapes of these motors are convenient in a case where these motors are provided together with an engine or are configured as in-wheel motors. It is known that, particularly for the axial gap type BLDC motor, field strengthening control is performed at the time of start-up and low-speed rotation in order to obtain a high torque, whereas field weakening control is performed at the time of high-speed rotation in order to obtain high-speed rotation. A reason for performing such field control is as follows: at the time of a low speed, if a field system magnetic flux is large, a high torque is obtained; but, at the time of a high speed, if the field system magnetic flux is large, an electromotive force constant is also large, a motor internal induced voltage approaches a power supply voltage, and this prevents current from flowing and makes the torque lower. For this reason, at the time of high-speed rotation, the field system magnetic flux is generated in a direction opposite to a direction in which a rotor magnetic pole is magnetized, and the torque at the time of the high speed is increased by the field weakening. In order to avoid this, it is conceivable to perform field control using a multipolar permanent magnet field motor, but such control using the multipolar permanent magnet field motor is complicated and expensive because, for example, a vector control technique needs to be effectively utilized. In this regard, in a case of the axial gap type BLDCM and SRM, if the rotor is moved in an axial direction such that a distance that is an air gap between a stator and a rotor becomes shorter at the time of low-speed rotation and becomes longer at the time of high-speed rotation, characteristics similar to those obtained by control for strengthening or weakening the field system magnetic flux can be produced.

FIG. 10 is a cross sectional view including a shaft of an axial gap type BLDCM according to a typical conventional art. FIG. 11 is a cross sectional view indicated by arrows D-D in FIG. 10. In FIG. 10 and FIG. 11, a function of varying an air gap between a rotor and a stator is not particularly provided, and a conventional typical structure is described. In this example, the number of portions of a stator iron core 19 is six, a winding wire 2 has three phases, and a rotor is tetrapolar. The winding wire 2 is wound around the stator iron core 19, and the stator iron core 19 is connected to a power supply by a lead wire for power supply 3. Illustration of a Hall element and the like is omitted. The rotor includes a permanent magnet 5. The permanent magnet 5 includes four fan-shaped segment magnets magnetized in an axial direction. Opposite polarities of the segment magnets are alternately arranged in a circumferential direction. The permanent magnet 5 is planarly opposed to the stator iron core 19 with the intermediation of an air gap in the axial direction. That is, this structure is of plane air gap type. A back yoke 17 fixedly attached to a rotating shaft 16 forms a magnetic circuit. That is, a combination of the permanent magnet 5, the back yoke 17, and the rotating shaft 16 is the rotor, and is rotatably supported by a housing 18 and the stator iron core 19 with the intermediation of a bearing 11.

Japanese Patent Laid-Open No. 2012-130086 is known as a conventional art for further forcibly varying a gap length in the typical axial gap type BLDC motor by means of an external force. According to Japanese Patent Laid-Open No. 2012-130086, a rotor is moved in an axial direction by a variable gap mechanism that is operated by a power source different from a rotational force of the axial gap type rotating electric machine, whereby an air gap width can be changed.

Unfortunately, conventional axial gap type rotating electric machines including the machine illustrated in FIG. 10 and FIG. 11 are of plane air gap type in which a field magnet and a stator iron core are planarly opposed to each other. Hence, compared with radial gap type motors, a torque cannot be made higher for the reason that a minimum air gap cannot be made small and other reasons, and practicality of such conventional axial gap type rotating electric machines is not sufficient in actual use. Further, compared with the radial gap type, an air gap length in the axial gap type needs to be approximately twice larger in consideration of rotor plane deflection, so that efficiency decreases accordingly.

Furthermore, air gap length-to-torque characteristics do not linearly change but non-linearly change, and hence controllability is not favorable.

The present invention, which has been made in view of the above-mentioned problems, has an object to provide an inexpensive high-performance rotating electric machine having practicality even in a case of a high output and also having high efficiency and high controllability.

SUMMARY OF THE INVENTION

A rotating electric machine according to the present invention includes: a stator; a rotor that is rotatably arranged with an intermediation of an air gap in a rotating shaft direction with respect to the stator; and a rotating member that is rotatable together with the rotor. The stator includes a stator iron core part including a plurality of first tooth parts and a plurality of salient-pole iron cores for a winding wire, the first tooth parts protrude in an axial direction and are formed in a concentric arc-like manner, and the salient-pole iron cores for the winding wire each have a winding wire axis formed parallel to the rotating shaft and are arranged in a distributed manner in a circumferential direction. The rotor includes magnetic poles that are made of a plurality of magnetic materials and are arranged in a distributed manner in the circumferential direction, and the magnetic poles include second tooth parts that protrude in the axial direction and are formed in a concentric arc-like manner, the second tooth parts being opposedly arranged so as to respectively engage with the first tooth parts with the intermediation of the air gap. The rotor is incorporated in the rotating member so as to be movable in the axial direction and so as not to be rotatable with respect to the rotating member. The rotating electric machine further includes an urging device that makes the air gap between the rotor and the stator adjustable.

The plurality of magnetic poles of the rotor that are arranged in the distributed manner in the circumferential direction may be alternately magnetized into opposite polarities by a permanent magnet magnetized in the axial direction.

In the rotating electric machine according to the present invention, any one of the rotor and the rotating member may have an outer peripheral surface on which an external gear extending in the axial direction is formed, and another of the rotor and the rotating member may have an inner peripheral surface on which an internal gear that engages with the external gear is formed.

In the rotating electric machine according to the present invention, the urging device may be an elastic member (such as a coil spring) that urges the rotor in the rotating shaft direction.

In the rotating electric machine according to the present invention, an urging force of the urging device can be smaller than an attraction force applied to the air gap at a time of low-speed rotation of the rotor, and can be larger than the attraction force at a time of high-speed rotation thereof. In the rotating electric machine according to the present invention, pre-expantion can be applied to between the stator and the rotor by the urging device. At a time of no current application to the winding wire, the rotor can be moved by the pre-expantion, and the air gap can be expanded up to a predetermined length. At a time of start-up of the rotating electric machine, the air gap can be contracted by an attraction force in the axial direction generated by a start-up current, to thereby become a minimum air gap.

An axial gap type BLDC motor of the present invention can rotate in a state where the first tooth parts and the second tooth parts that are respectively formed in the stator and the rotor in concavo-convex shapes engage with each other. Hence, an interlinkage magnetic flux of the motor of the present invention can be more than twice as large as that of a plane gap type motor, and torques thereof at the time of start-up and a low speed can also be more than twice. Moreover, the motor of the present invention generates lower noise compared with a conventional axial gap type motor.

The first tooth parts formed in the stator and the second tooth parts formed in the rotor opposedly engage with each other in an air gap opposing portion therebetween, and hence an opposing area increases, whereby a high-efficiency rotating electric machine having a high air gap permeance is obtained. With regard to an increase in air gap, because the attraction force in the axial direction and the torque of the rotating electric machine are substantially proportional to the air gap length, the torque can be easily controlled by controlling the air gap length.

Similarly, an axial gap type SRM of the present invention can rotate in a state where the first tooth parts and the second tooth parts that are respectively formed in the stator and the rotor in concavo-convex shapes engage with each other. Hence, the SRM of the present invention is also superior to conventional arts.

If an axial gap type rotating electric machine of the present invention is applied to a main driving machine of an electric car, electric power required for field strengthening at the time of a low speed and field weakening at the time of a high speed is not necessary, so that driving efficiency can be enhanced.

DETAILED DESCRIPTION OF THE PREFERRED EMBODIMENTS

Hereinafter, description is given with reference to the drawings.

EMBODIMENTS

First Embodiment

A stator iron core part 1 and rotor magnetic poles 4 of an axial gap type motor of the present invention can be easily and inexpensively manufactured by pressing a pressed powder core. According to a method of laminating silicon steel plates, in a case of a conventional radial gap type, iron cores each having a two-dimensional shape are laminated in an axial direction, and a magnetic path of a field system magnetic flux is planar and perpendicular to an axis. In the axial gap type motor, a magnetic path of a field system magnetic flux is three-dimensional, and hence the method of laminating silicon steel plates has a problem that the magnetic flux has difficulty in passing in a lamination direction. This is another reason why the axial gap type motor does not become more popular than the radial gap type motor. In this regard, the pressed powder core is non-directional, and thus is suitable to configure a three-dimensional shape. The pressed powder core is obtained by coating soft magnetic iron powder with resin, pressurizing the coated powder, and then heating the pressurized powder. From the pressed powder core, an article having a complicated shape can be manufactured using a press die. Magnetic permeability of the pressed powder core is lower than that in a rolling direction of the silicon steel plates, but a magnetic flux passing direction thereof is non-directional. Because particles of the iron powder are insulated from each other by the coating resin, an eddy current does not occur, and an iron loss is small in the obtained iron core.

Figure 1:
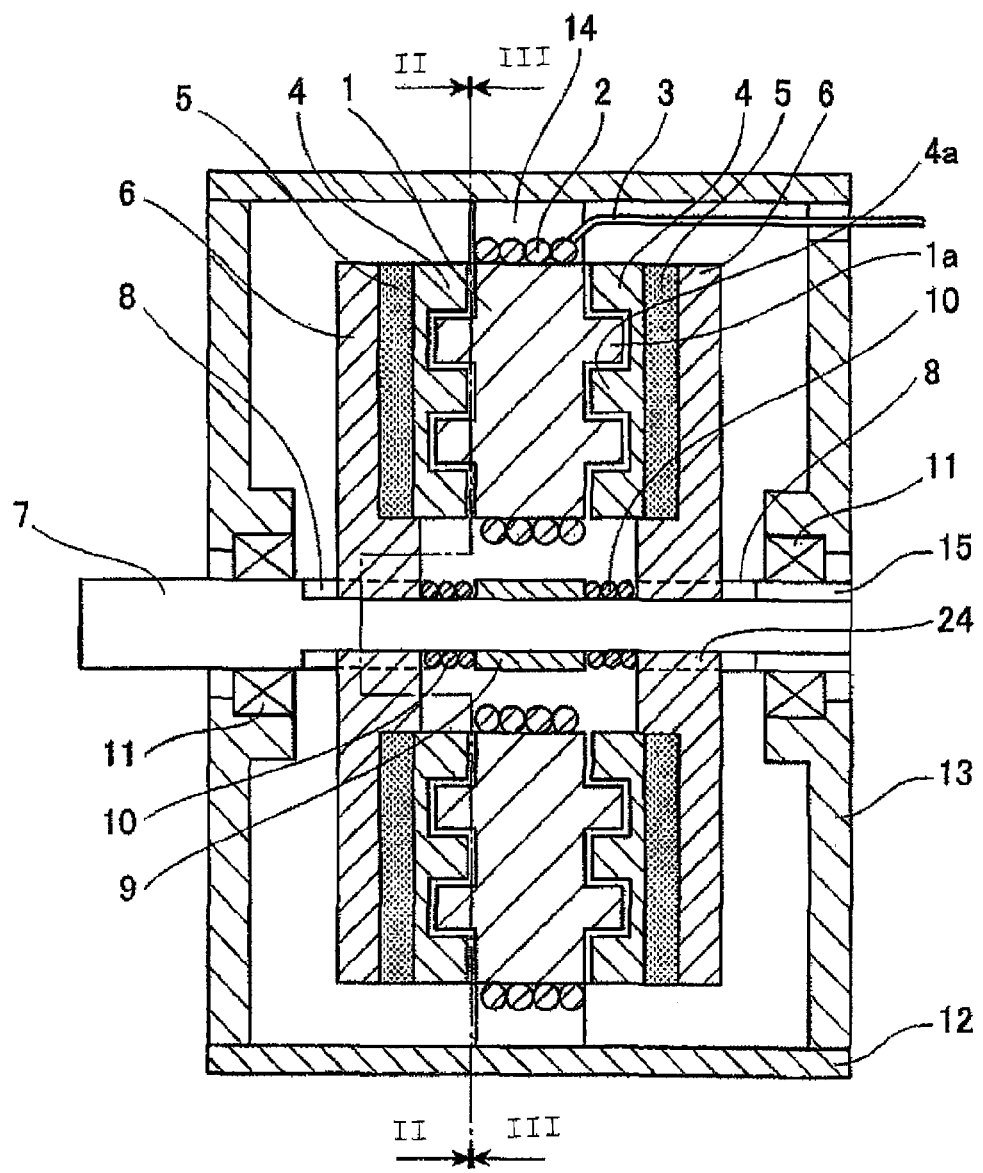
FIG. 1 is a cross sectional view in an axial direction of a rotating electric machine according to a first embodiment of the present invention.
Figure 2:
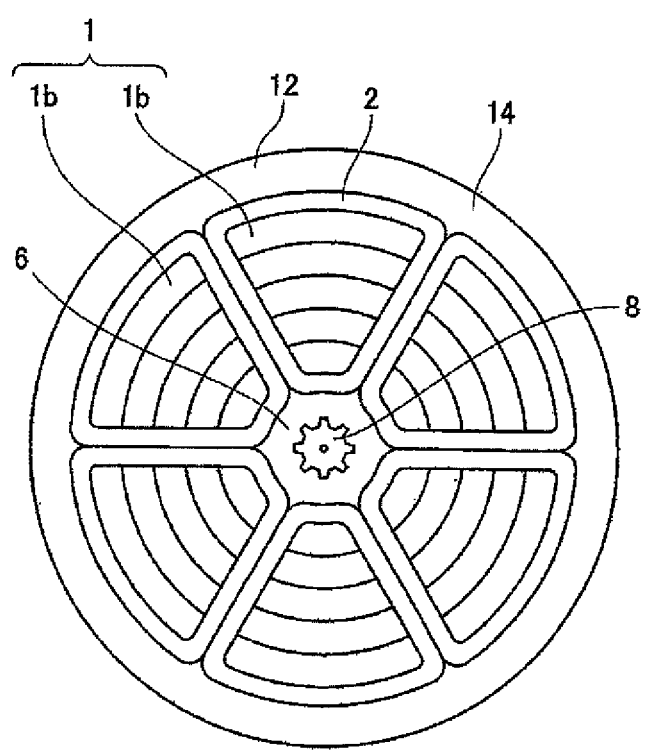
FIG. 2 is a cross sectional view indicated by arrows II-II in FIG. 1.
Figure 3:
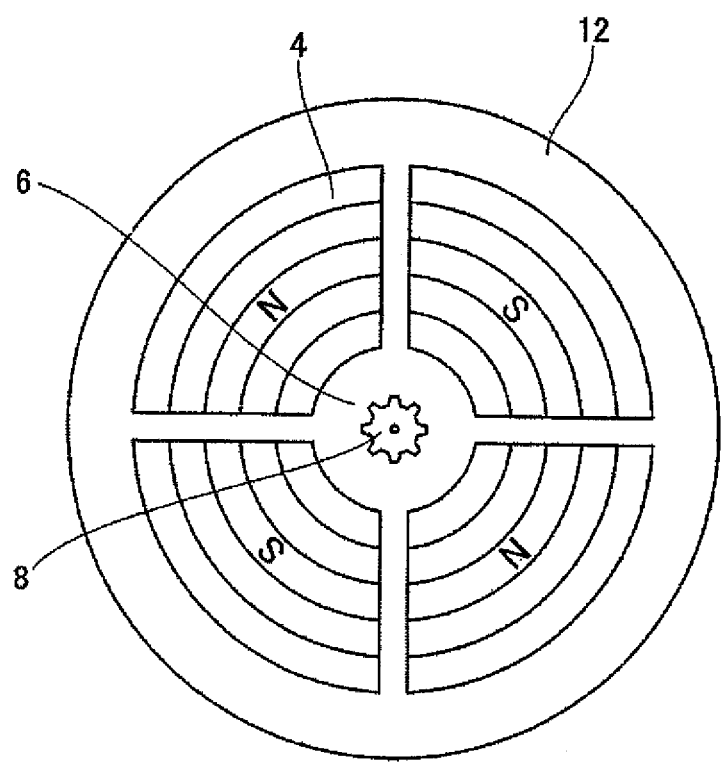
FIG. 3 is a cross sectional view indicated by arrows III-III in FIG. 1.

FIG. 1 illustrates an example configuration of the present invention, which is an axis-rotation variable double gap type rotating electric machine. FIG. 2 is a cross sectional view indicated by arrows II-II in the rotating electric machine of FIG. 1, and FIG. 3 is a cross sectional view indicated by arrows III-III in the rotating electric machine of FIG. 1. A first embodiment of the present invention is described with reference to FIGS. 1 to 3.

As illustrated in FIG. 2, the stator iron core part 1 includes salient-pole iron cores for a winding wire 1b that are made of the pressed powder core and the like and are arranged in a discoid manner. As illustrated in FIG. 1, the salient-pole iron cores for the winding wire 1b include a plurality of first tooth parts 1a that protrude in the axial direction and are formed in a concentric arc-like manner. In an example of these drawings, the stator iron core part 1 includes six salient-pole iron cores for a winding wire 1b, a winding wire 2 has three phases, and a rotor is tetrapolar. A combination of the number of divisions m of the stator iron core part 1 and the number of poles n of the rotor is, for example, m=12, n=8, 10, or m=9, n=8, 10, and can also be various other combinations. The winding wire 2 is wound around an outer peripheral surface of the stator iron core part 1, and a lead wire for power supply 3 is connected to the winding wire 2. Illustration of a Hall element and the like is omitted.

The rotor magnetic poles 4 are made of the pressed powder core and the like similarly to the stator iron core part 1, and are provided with a plurality of second tooth parts 4a that are formed in the axial direction in a concentric arc-like manner. The second tooth parts 4a are oppsedly arranged so as to respectively engage with the first tooth parts 1a in a concavo-convex manner with the intermediation of an air gap. A permanent magnet 5 is arranged on a back surface of the rotor magnetic poles 4, and includes four segment magnets whose projected shape viewed from the axial direction is substantially a same fan shape as that of each rotor magnetic pole 4. N poles and S poles of the four segment magnets are alternately arranged.

A discoid back yoke 6 is arranged on a back surface of the permanent magnet 5. An internal gear 24 is formed in an inner circumferential portion of the back yoke 6. Views observed from the axial direction are illustrated in FIG. 2 and FIG. 3. The rotor magnetic poles 4, the permanent magnet 5, and the back yoke 6 fixedly attached to one another form one rotor. Another rotor having a same structure is arranged on an opposite side in the axial direction of the stator iron core part 1. The two rotors are fitted to an external gear 8 formed on a shaft 7 with an appropriate clearance, while maintaining an air gap with respect to the stator. That is, the rotors are movable by a predetermined length in the axial direction, and can transmit their rotational forces to the shaft 7. A cylindrical member 9 is attached to a substantially central portion of the shaft 7, and a coil spring 10 as an urging device is attached to between the cylindrical member 9 and each back yoke 6. The back yoke 6 is urged outward in the axial direction by the coil spring 10.

The stator and the rotors are housed in a housing 12, and both ends of the housing 12 are closed by a cover 13. The shaft 7 is rotatably supported by a bearing 11 such as a ball bearing arranged in the cover 13.

A cylindrical member 15 is attached to one end of the shaft 7. The cylindrical member 15 facilitates assembling of the shaft 7, the rotors, and other components. The six winding wire configuration of the stator is mainly illustrated in FIG. 2, and the four poles of the rotor are illustrated in FIG. 3. Because the stator iron core part 1 is divided into six portions in the drawings, the six portions are coupled by a resin mold 14 or the like, and are fixedly attached to the housing 12. The six portions of the stator iron core part 1 may be coupled to one another in a central portion in the axial direction, and the salient-pole iron cores on both sides may be provided with the winding wire from both the sides.

Next, an operation of FIG. 1 is described. In a case where this rotating electric machine starts up a load, a maximum current according to a started load torque flows in the BLDCM. Because a larger attraction force in the axial direction is generated in the axial gap type motor than in the radial gap type motor, as illustrated in FIG. 1, the rotors on both sides are attracted toward the stator iron core part 1 with a predetermined minimum air gap, and start up. A spring constant of the coil spring 10 is set to such a value that the coil spring 10 is contracted close to a minimum spring length by the axial attraction force generated by the start-up current application and that the coil spring 10 pushes back and moves the rotor in the axial direction by a predetermined length at the time of no current application to the winding wire 2. As the speed of the rotor is increased after the start-up, the load current decreases. Hence, the gap attraction force also decreases to come into balance with the spring force, and the air gap length increases. As a result, a field weakening effect is produced, and the number of rotations can be increased. Detailed description thereof is further described later with reference to FIG. 9. It is important that the gap length and the generated torque linearly change, and the present invention is suitable in this regard, which is described later with reference to FIG. 8.

Figure 4:
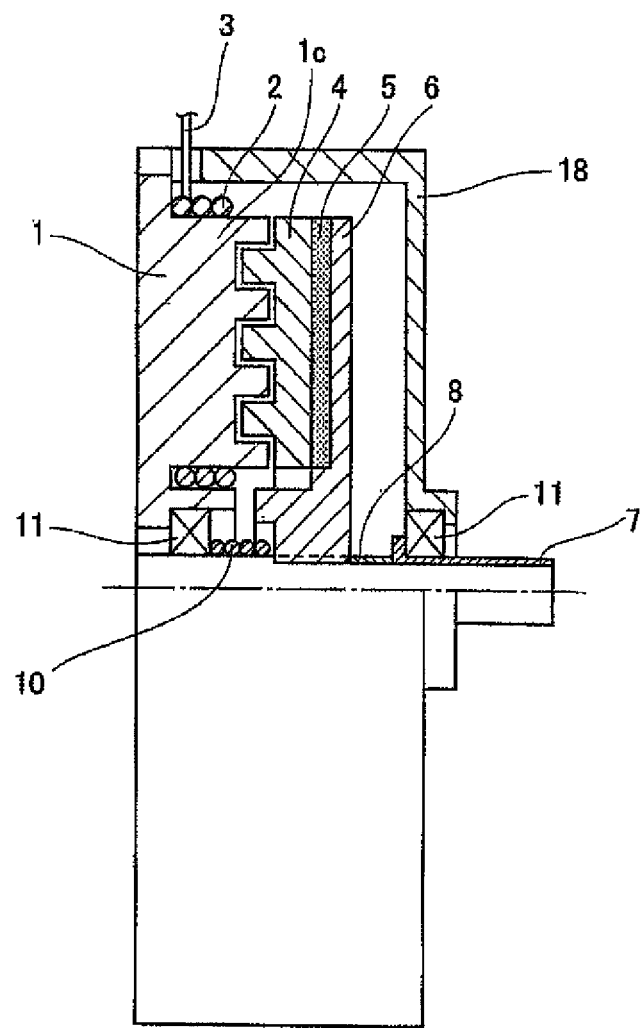
FIG. 4 is a cross sectional view in an axial direction of a rotating electric machine according to a modified example of the first embodiment of the present invention.

FIG. 4 illustrates an example in which the present invention is applied to a one-side gap type motor, whereas FIG. 1 illustrates the double gap type in which the rotors are respectively arranged on both the sides of the stator in the axial direction. The stator iron core part 1 includes six protruding parts for a winding wire 1c, and one ends of the protruding parts for the winding wire 1c are coupled to one another as an integrated iron core. Only FIG. 4, which is a cross sectional view including a shaft, is given for description of the one-side gap type motor. Views of the one-side gap type motor observed from the axial direction are the same as FIG. 2 and FIG. 3, and are thus omitted. Components having same functions as those of the double gap type motor are denoted by same reference signs, and hence description thereof is omitted. Operations and functions of the one-side gap type motor are the same as those of the double gap type motor, and hence description thereof is omitted.

Second Embodiment

Figure 5:
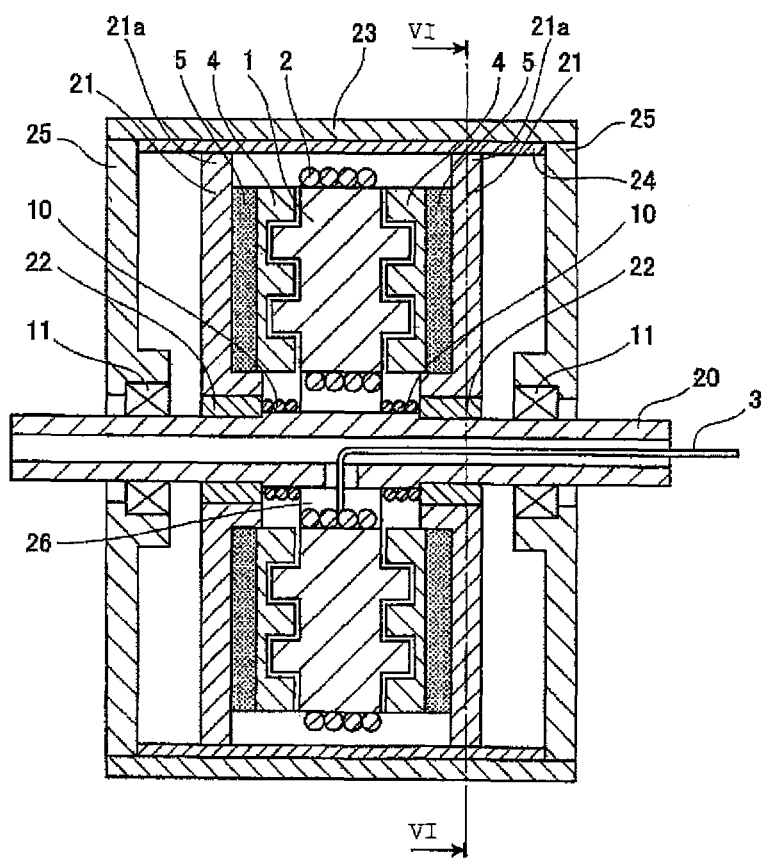
FIG. 5 is a cross sectional view in an axial direction of a rotating electric machine according to a second embodiment of the present invention.

FIG. 5 illustrates an example in which the present invention is applied to an axial double gap type motor having a fixed central shaft. This structure can be easily applied as an in-wheel motor to an electric car, a wheelchair, a golf cart, an electric motorcycle, and an electric bicycle, if a fixed shaft 20 is gripped from both sides thereof and if a tire is fitted to an outer periphery of a motor rotating member. That is, the tire may be fitted to a housing 23 in FIG. 5 to be described later.

A rotating electric machine according to a second embodiment illustrated in FIG. 5 is described. The stator iron core part 1, the winding wire 2, the rotor magnetic poles 4, and the permanent magnets 5 are the same as those in the rotating electric machine according to the first embodiment illustrated in FIG. 1. The second embodiment is different from the first embodiment in that the shaft 20 is fixed by the stator iron core part 1 and a core member 26 made of an injected resin and the like. A current is fed to the winding wire 2 by arranging the lead wire 3 in a hole or a groove provided in the shaft 20. A back yoke 21 is rotatably arranged with the intermediation of a bearing 22 that is rotatable and movable in a thrust direction with respect to the fixed shaft 20. An external gear 21a is formed in an outer periphery of the back yoke 21, and an internal gear 24 formed in an inner periphery of the housing 23 is arranged with an appropriate clearance so as to engage with the external gear 21a. The housing 23 is supported to the fixed shaft 20 by a cover 25 with the intermediation of the bearing 11.

The coil spring 10 that applies an urging force is arranged between the thrust bearing 22 and the core member 26 around the fixed shaft 20, and an operation of the coil spring 10 is the same as that in FIG. 1. That is, a spring constant of the coil spring 10 is set to such a value that the coil spring 10 is contracted close to a minimum spring length by the axial attraction force generated by the start-up current application and that the coil spring 10 pushes back and moves the rotor in the axial direction by a predetermined length at the time of no current application to the winding wire 2. As the speed of the rotor is increased after the start-up, the load current decreases. Hence, the gap attraction force decreases to come into balance with the spring force, and the air gap length increases. As a result, a field weakening effect is produced, and the number of rotations can be increased. In this case, FIG. 5 is significantly different from FIG. 1 in the following point: in FIG. 1, the torque of the rotor is transmitted to the shaft 7; and, in FIG. 5, the torque of the rotor is transmitted to the housing 23. Even if the back yoke 21 is moved in the axial direction, because the back yoke 21 is slidingly translated with respect to the internal gear 24, the housing 23 can be moved in the axial direction without any problem.

Figure 6:
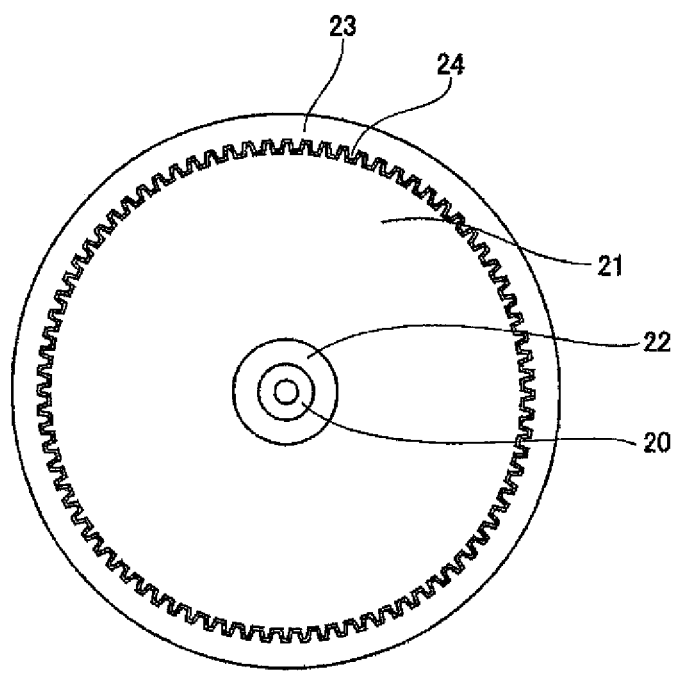
FIG. 6 is a cross sectional view indicated by arrows VI-VI in FIG. 5.

FIG. 6 is a cross sectional view indicated by arrows VI-VI in FIG. 5, and illustrates engagement-fit portions between the thrust bearing 22 and the fixed shaft 20 and between the internal gear 24 of the housing 23 and the back yoke 21, which are observed from the axial direction. As a matter of course, the present invention can also be applied to an axial single gap type motor having a fixed shaft, instead of the axial double gap type motor in FIG. 5. Illustration and description thereof are omitted.

Figure 7:
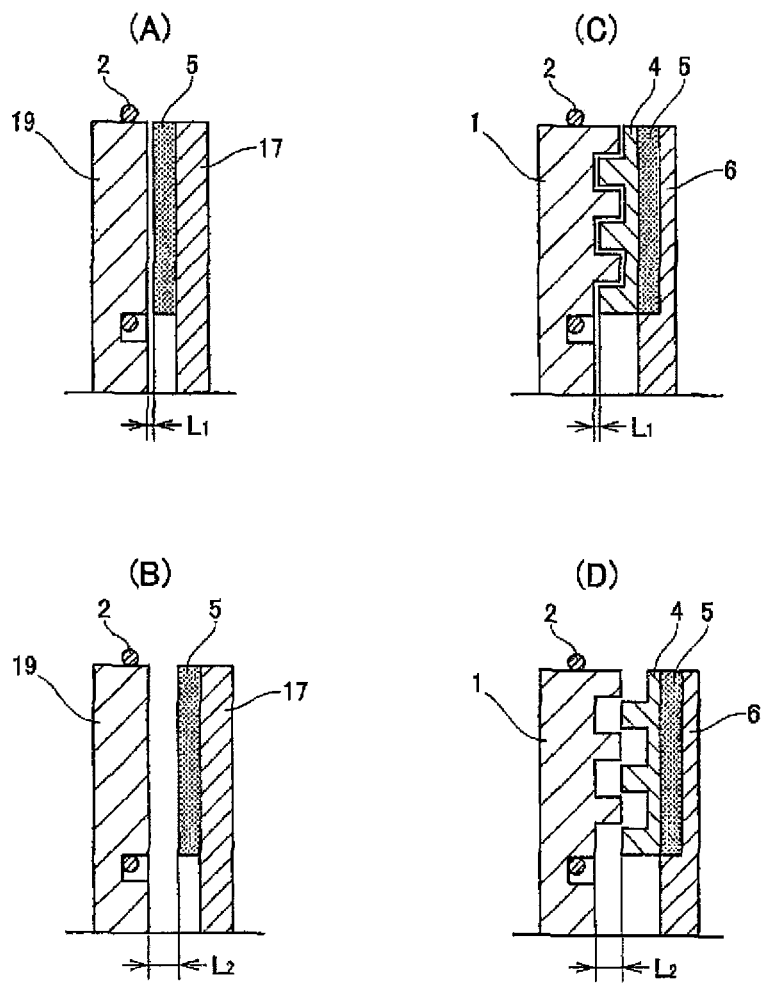
FIG. 7 are explanatory views of an operation principle of the present invention.
Figure 8:
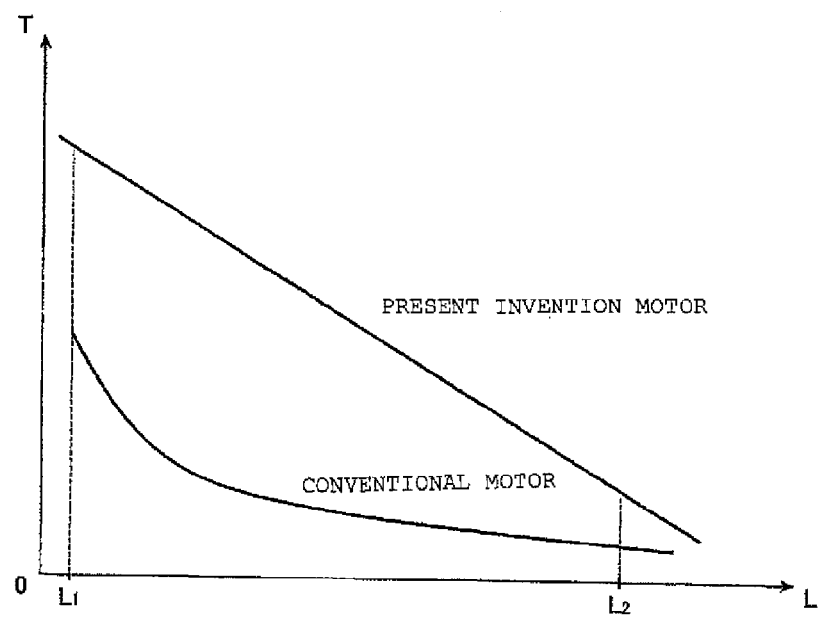
FIG. 8 is an explanatory graph of effects of the present invention.

FIG. 7 are explanatory views of an operation principle of the present invention, and FIG. 8 is a graph for comparing effects of the present invention with those of a conventional art.

Figure 10:
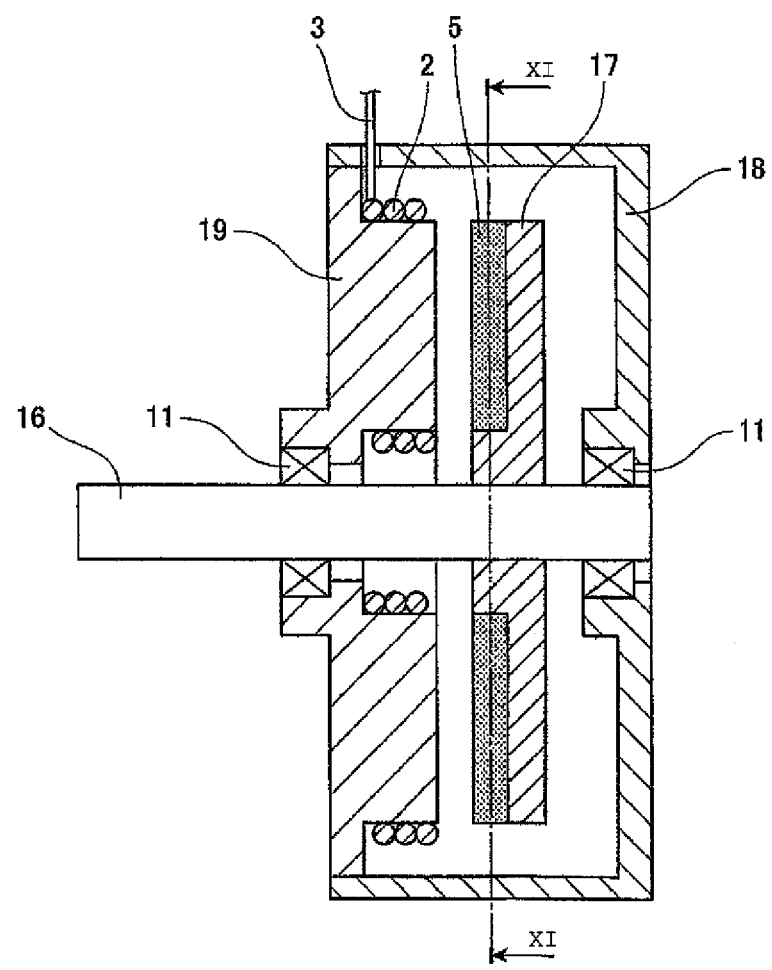
FIG. 10 is a cross sectional view in an axial direction of a conventional rotating electric machine.
Figure 11:
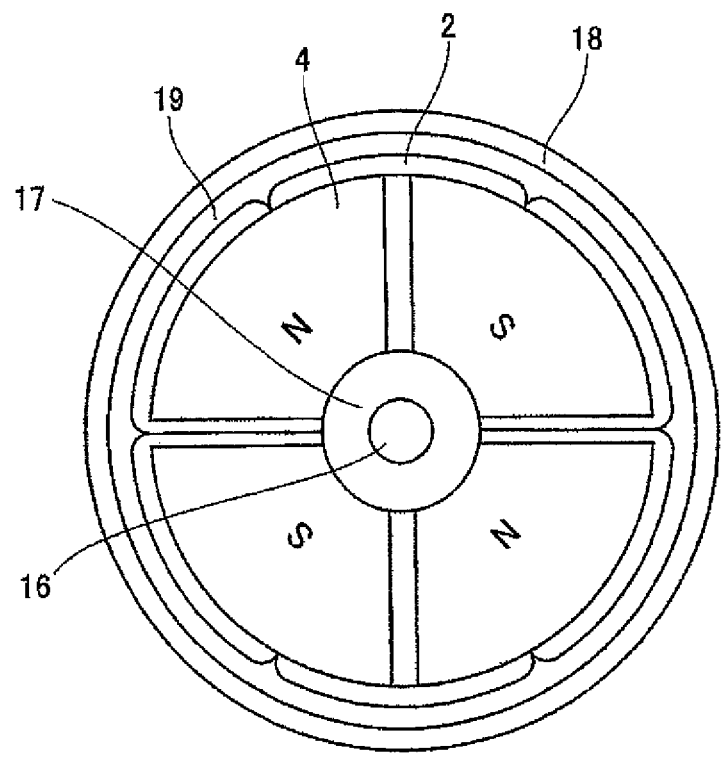
FIG. 11 is a cross sectional view indicated by arrows XI-XI in FIG. 10.

FIG. 7A illustrates a conventional motor, in which the air gap is minimum L1, FIG. 7B illustrates the conventional motor, in which the air gap gradually increases to reach maximum L2, FIG. 7C illustrates the present invention motor, in which the air gap is minimum L1, and FIG. 7D illustrates the present invention motor, in which the air gap gradually increases to reach maximum L2. Configurations of the conventional motor and the present invention motor have already been described with reference to FIG. 10 and FIG. 1, respectively, and hence description thereof is omitted.

The torque of the motor is proportional to an interlinkage magnetic flux. The interlinkage magnetic flux is proportional to a gap permeance P, and the gap permeance P is obtained by the following expression.

$$P = \mu_0 S/L \quad (1)$$

where $\mu_0$ represents magnetic permeability in vacuum, S represents a gap opposing area, and L represents an air gap length.

In Expression (1), the present invention motor includes a concavo-convex gap, and hence the gap opposing area S thereof can be easily twice to three times that of the conventional motor. Accordingly, the permeance P of the present invention motor is also twice to three times, and the torque thereof can be increased in proportion to P. Accordingly, a decrease in torque caused by an increase in air gap, which is a disadvantage of the axial gap type motor compared with the radial gap type motor, can be improved. Although the present invention uses the pressed powder core, lower magnetic permeability of the pressed powder than that of the silicon steel plates can be covered by effects produced by the concavo-convex gap. Here, with reference to FIG. 8, characteristics of a torque T when the air gap length L is changed are compared between the present invention motor and the conventional axial gap type motor. That is, even if the air gap is the same L1, the torque of the present invention motor is approximately twice that of the conventional motor. As the air gap length L increases, the torque of the conventional motor decreases in inverse proportion to a square of the air gap length L, whereas the torque of the present invention motor decreases substantially linearly as shown in FIG. 8 until the air gap length L reaches L2. This is because, in the present invention motor, the stator tooth parts and the rotor tooth parts are always opposed to each other in the radial direction. In a case of such a linear decrease in torque, the torque can be linearly controlled by variable control of the air gap length L, and control of a car from a low speed to a high speed is facilitated if the motor is used as an in-wheel motor. Further, according to results obtained by experimental production, although the present invention motor is the axial gap type motor, the present invention motor includes a radial gap opposing portion, and hence noise is significantly lower than that in a plane gap type axial motor.

Figure 9:
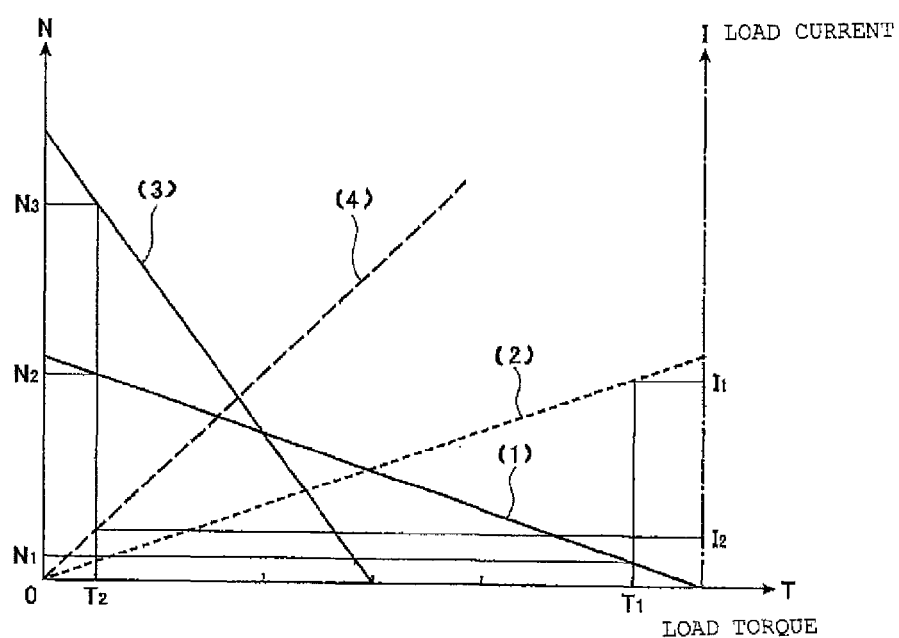
FIG. 9 is an explanatory graph of a characteristic change according to the present invention.

FIG. 9 is a graph for describing characteristics when the air gap of the axial variable air gap type motor according to the present invention is varied. A speed-load torque characteristic at the time of a minimum air gap is indicated by a solid line (1), and a current-load torque characteristic at this time is indicated by a dotted line (2). With reference to a speed-load torque curve indicated by the solid line (1) at the time of the minimum air gap, if the motor is started up with a start-up torque T1 and a speed N1, a current I1 is close to a maximum current, and the attraction force in the axial direction is large. If the attraction force in the axial direction is set to be larger than a precompressed spring force of the coil spring 10, the motor is started up with a high torque while holding the minimum air gap, and then increases its speed. Along with the increase in speed, the load torque decreases, and the load current also decreases. Consequently, the attraction force in the axial direction also decreases to become smaller than the precompressed spring force, and the air gap increases. A speed-load torque characteristic at the time of a maximum air gap when the gap length has increased up to a predetermined air gap is indicated by a solid line (3), and a current-load torque characteristic at this time is indicated by a dotted line (4). At this time, the load torque is T2, and the current is I2. That is, the speed-load torque characteristic of the present invention motor continuously smoothly changes from (1) to (3), and the load is started up and accelerated. If the speed-load torque characteristic is only (1) with the air gap being fixed, when the load torque is T2, the speed increases up to only N2. In contrast, according to the variable air gap type motor of the present invention, the speed can increase up to N3 on the speed-load torque characteristic (3). In order to change the speed-load torque characteristic to (1) by field strengthening control and change the same to (3) by field weakening control, an extra exciting coil, field control power, a complicated vector control circuit, or the like is necessary.

Although description is given above mainly of the axial gap type BLDCM in which the respective opposing surfaces of the stator and the rotor are formed in concavo-convex shapes for mutual engagement, the respective opposing surfaces thereof may be formed in arc-like or triangular tooth shapes for mutual engagement, and sufficient effects can be produced even in this case. Similarly for a SRM, in which a permanent magnet is not used, the respective opposing surfaces of the stator and the rotor may be formed in concavo-convex, arc-like, or triangular tooth shapes for mutual engagement, and sufficient effects can be produced even in this case. In a case of the SRM, the speed-torque curve shown in FIG. 9 is not as straight as that of the BLDCM, but the characteristic curve changes with a tendency of approximately from (1) to (3) along with an increase in air gap. Accordingly, application of the present invention to the SRM is also advantageous because an inexpensive motor that does not require a permanent magnet can be adopted.

The axial gap type rotating electric machine according to the present invention is inexpensive and robust, achieves reduction in weight, thickness, length, and size, achieves improvement in torque and efficiency, generates lower noise, and is simple and extremely practical. Accordingly, industrially great contributions of the axial gap type rotating electric machine are expected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2013-205800 filed on Sep. 30, 2013 including the specification, claims, drawings and summary is incorporated herein by reference in its entirety.

What is claimed is:

1. A rotating electric machine comprising:
a stator;
a rotor that is rotatably arranged with an intermediation of an air gap in a rotating shaft direction with respect to the stator; and
a rotating member that is rotatable together with the rotor, wherein:
the stator includes a stator iron core part including a plurality of first tooth parts and a plurality of salient-pole iron cores for a winding wire,
the first tooth parts protrude in an axial direction and are formed in a concentric arc-like manner,
the salient-pole iron cores for the winding wire each have a winding wire axis formed parallel to the rotating shaft and are arranged in a distributed manner in a circumferential direction,
the rotor includes rotor magnetic poles that are made of a plurality of magnetic materials and are arranged in a distributed manner in the circumferential direction,
the rotor magnetic poles include second tooth parts that protrude in the axial direction and are formed in a concentric arc-like manner, the second tooth parts being opposedly arranged so as to respectively engage with the first tooth parts with the intermediation of the air gap,
the rotor is incorporated in the rotating member so as to be movable in the axial direction and so as not to be rotatable with respect to the rotating member, and
the rotating electric machine further comprises an urging device that makes the air gap between the rotor and the stator adjustable.

2. The rotating electric machine according to claim 1, wherein
the plurality of magnetic poles of the rotor that are arranged in the distributed manner in the circumferential direction are alternately magnetized into opposite polarities by a permanent magnet magnetized in the axial direction.

3. The rotating electric machine according to claim 1, wherein
any one of the rotor and the rotating member has an outer peripheral surface on which an external gear extending in the axial direction is formed, and
another of the rotor and the rotating member has an inner peripheral surface on which an internal gear that engages with the external gear is formed.

4. The rotating electric machine according claim 1, wherein
the urging device is an elastic member that urges the rotor in the rotating shaft direction.

5. The rotating electric machine according to claim 1, wherein
an urging force of the urging device is smaller than an attraction force applied to the air gap at a time of low-speed rotation of the rotor, and is larger than the attraction force at a time of high-speed rotation thereof.

6. The rotating electric machine according to claim 1, wherein pre-expansion is applied to between the stator and the rotor by the urging device,
at a time of no current application to the winding wire, the rotor is moved by the pre-expansion, and the air gap is expanded up to a predetermined length, and
at a time of start-up of the rotating electric machine, the air gap is contracted by an attraction force in the axial direction generated by a start-up current, to thereby become a minimum air gap.

* * * * *